(12) United States Patent
Chaverot et al.

(10) Patent No.: US 8,506,699 B2
(45) Date of Patent: Aug. 13, 2013

(54) THERMOREVERSIBLY CROSSLINKED ELASTIC BITUMINOUS COMPOSITION

(75) Inventors: Pierre Chaverot, Sainte Croix en Jarez (FR); Sylvia Dreessen, Solaise (FR); Laurent Bouteiller, Bourg la Reine (FR); Emmanuelle Bugnet, Charenton-le-Pont (FR)

(73) Assignees: Total Raffinage Marketing, Puteaux (FR); Universite Pierre et Marie Curie, Paris (FR)

( * ) Notice: Subject to any disclaimer, the term of this patent is extended or adjusted under 35 U.S.C. 154(b) by 381 days.

(21) Appl. No.: 12/744,855

(22) PCT Filed: Nov. 25, 2008

(86) PCT No.: PCT/FR2008/001636
§ 371 (c)(1),
(2), (4) Date: Jan. 19, 2011

(87) PCT Pub. No.: WO2009/101275
PCT Pub. Date: Aug. 20, 2009

(65) Prior Publication Data
US 2011/0144242 A1   Jun. 16, 2011

(30) Foreign Application Priority Data
Nov. 27, 2007   (FR) ..................... 07 08275

(51) Int. Cl.
C08L 95/00   (2006.01)
(52) U.S. Cl.
USPC ............. 106/273.1; 106/277; 106/281.1; 106/246; 524/59
(58) Field of Classification Search
USPC .......... 106/273.1, 277, 281.1, 246; 524/59
See application file for complete search history.

(56) References Cited

U.S. PATENT DOCUMENTS

| | | | |
|---|---|---|---|
| 4,145,322 A | 3/1979 | Maldonado et al. | |
| 4,464,286 A | 8/1984 | Schilling | |
| 4,629,754 A | 12/1986 | Syrier et al. | |
| 4,650,820 A | 3/1987 | Decroix | |
| 5,120,777 A * | 6/1992 | Chaverot et al. | 106/284.04 |
| 5,314,935 A | 5/1994 | Chaverot et al. | |
| 5,382,612 A | 1/1995 | Chaverot et al. | |
| 5,414,029 A | 5/1995 | Lemoine et al. | |
| 5,428,085 A | 6/1995 | Burel et al. | |
| 5,618,862 A | 4/1997 | Germanaud et al. | |
| 5,756,565 A | 5/1998 | Germanaud et al. | |
| 5,880,185 A | 3/1999 | Planche et al. | |
| 5,883,162 A | 3/1999 | Planche et al. | |
| 5,990,207 A | 11/1999 | Perret et al. | |
| 6,011,094 A | 1/2000 | Planche et al. | |
| 6,011,095 A | 1/2000 | Planche et al. | |
| 6,087,420 A | 7/2000 | Planche et al. | |
| 6,218,449 B1 | 4/2001 | Planche et al. | |
| 6,852,779 B1 | 2/2005 | Planche et al. | |
| 8,202,922 B2 * | 6/2012 | Botel et al. | 524/59 |
| 8,273,809 B2 * | 9/2012 | Chaverot et al. | 524/68 |
| 2002/0052432 A1 | 5/2002 | Lemoine et al. | |
| 2009/0030118 A1 | 1/2009 | Lapalu et al. | |
| 2009/0062551 A1 | 3/2009 | Tournilhac et al. | |
| 2010/0192804 A1 * | 8/2010 | Lapalu et al. | 106/273.1 |

FOREIGN PATENT DOCUMENTS

| | | |
|---|---|---|
| EP | 0 179 510 | 4/1986 |
| EP | 0 416 682 | 3/1991 |
| EP | 0 690 892 | 1/1996 |
| EP | 0 799 280 | 10/1997 |
| FR | 2 376 188 | 7/1978 |
| FR | 2 525 618 | 10/1983 |
| FR | 2 536 081 | 5/1984 |
| WO | WO 94/22958 | 3/1994 |
| WO | WO 97/14754 | 4/1997 |
| WO | WO 2006/087475 | 8/2006 |

OTHER PUBLICATIONS

Terech, Pierre et al.; "Low Molecular Mass Gelators of Organic Liquids and the Properties of Their Gels;" Chem. Rev., vol. 97, No. 8, pp. 3133-3159, Mar. 1997.

* cited by examiner

*Primary Examiner* — Helene Klemanski
(74) *Attorney, Agent, or Firm* — Harness, Dickey & Pierce, P.L.C.

(57) ABSTRACT

The disclosure relates to a bituminous composition comprising at least one bitumen and at least one organogelling molecule taken alone or as a mixture, said organogelling molecule being represented by the following general formula (I): where: A represents an acyclic, cyclic or polycyclic, saturated or unsaturated, linear or branched hydrocarbon-based group having 3 to 92 carbon atoms, resulting from the polymerization of the side chains of at least one unsaturated fatty acid, X represents an NH group or an oxygen atom O, $R_1$ represents a group chosen from: a linear or branched hydrocarbon-based group having 2 to 40 carbon atoms, optionally comprising one or more heteroatoms and optionally comprising one or more unsaturations, or a substituted or unsubstituted aromatic group, $R_2$ represents a group chosen from: a hydrogen atom, a linear or branched hydrocarbon-based group having 1 to 40 carbon atoms, comprising one or more heteroatoms and optionally comprising one or more unsaturations, or a substituted or unsubstituted aromatic group, m and n represent, independently of one another, an integer that varies from 1 to 4, p represents an integer that varies from 0 to 4, q represents an integer that varies from 1 to 4 or a combination of these values, Y represents a group comprising a hydrogen bond donor such as the NH group and a hydrogen bond acceptor such as the C=O group.

22 Claims, No Drawings

THERMOREVERSIBLY CROSSLINKED ELASTIC BITUMINOUS COMPOSITION

CROSS-REFERENCE TO RELATED APPLICATIONS

This application is a National Phase Entry of International Application No. PCT/FR2008/001636, filed on Nov. 25, 2008, which claims priority to French Application 0708275, filed on Nov. 27, 2007, both of which are incorporated by reference herein.

TECHNICAL FIELD

The present invention belongs to the field of bitumens. More specifically, it relates to bituminous compositions comprising organogelling molecules. Thermoreversibly crosslinked bituminous compositions are hard and elastic at temperatures of use and have a reduced viscosity at application temperatures. The invention also relates to the use of these bituminous compositions in the fields of highway applications, in particular in the production of road binders, and in the fields of industrial applications. The invention also relates to the process for the preparation of these bituminous compositions.

TECHNICAL CONTEXT

The use of bitumen in the production of materials for highway and industrial applications has been known for a long time: bitumen is the main hydrocarbon binder used in the field of highway construction or civil engineering. In order to be able to be used as a binder in these different applications, the bitumen must have certain physico-chemical and mechanical properties. It must in particular be sufficiently hard at temperatures of use to avoid for example the formation of ruts caused by traffic. The bitumen must also be elastic in order to resist the deformations caused by traffic and/or changes of temperature, phenomena which lead to cracking of the mixes or to the disintegration of the surface aggregates. Finally, the bitumen must be sufficiently fluid at the lowest possible application temperatures in order to allow good coating of the aggregates and the application of the mix to the road as well as its compacting with current technical means in highway construction. The use of a bituminous binder therefore requires a combination of both hardness and elasticity of the bitumen at temperatures of use and a low viscosity at application temperatures. As bitumen alone is generally not elastic enough, polymers which can be optionally crosslinked are added to the bitumen. These crosslinked polymers give the bituminous clearly improved elastic properties. However, the crosslinking is irreversible; once the crosslinking has been carried out, it is not possible to return to the initial state existing before the crosslinking reaction. Crosslinked bituminous compositions thus have good elastic properties, but their viscosity is very high. In fact it is not possible to obtain both a good elasticity and a fluid composition with irreversibly crosslinked polymers. The mechanical properties, including elasticity, are promoted by a crosslinking of the polymers whereas fluidity is promoted by an absence of crosslinking or weak crosslinking of the polymers. According to the applications envisaged, it is necessary to find a good compromise between the mechanical properties including elasticity and fluidity by adjusting the rate of crosslinking or the nature of the crosslinking.

PRIOR ART

Crosslinking according to the prior art is usually irreversible crosslinkings based on the formation of covalent bonds between the polymers. Thus one of the most used crosslinkings in the field of bitumens is sulphur crosslinking or vulcanization. In sulphur crosslinking, more or less short sulphur chains (in general from 8 to 2 sulphur atoms) covalently bond the polymers. By altering the chemical nature of the donor of the sulphur and/or polymer, the temperature, the concentration of the polymer and/or of the sulphur donors, the Applicant has thus developed and patented a large number of crosslinked bituminous compositions having clearly improved properties with respect to the bitumen without polymers and with respect to the non-crosslinked bitumen/polymer physical mixture. Among the Applicant's patents, there can be mentioned the following references in particular: FR2376188, FR2429241, EP0799280, EP0690892. Recently in two unpublished patent applications the applicant company developed a novel type of reversible polymer crosslinking based on the use of grafted polymers combining at temperatures of use via long paraffinic domains, the combination disappearing at application temperatures.

SUMMARY

Under these circumstances, the object of the present invention is to propose novel thermoreversibly crosslinked bituminous compositions. Another objective of the invention is to propose bituminous compositions exhibiting at temperatures of use the properties of the irreversibly crosslinked bituminous compositions in terms of the elasticity and hardness, and exhibiting reduced viscosity at application temperatures. Another objective of the invention is to propose a simple process for preparing thermoreversibly crosslinked bituminous compositions.

BRIEF DESCRIPTION

The invention relates to a bituminous composition comprising at least one bitumen and at least one organogelling molecule taken alone or in a mixture, said organogelling molecule being represented by the following general formula (I):

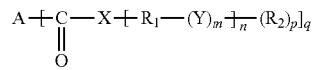

where:

A represents an acyclic, cyclic or polycyclic, saturated or unsaturated, linear or branched hydrocarbon group of 3 to 92 carbon atoms, resulting from the polymerization of the side chains of at least one unsaturated fatty acid, X represents an NH group or an oxygen atom 0;

$R_1$ represents a group chosen from: a linear or branched hydrocarbon group of 2 to 40 carbon atoms, optionally comprising one or more heteroatoms and optionally comprising one or more unsaturations, or a substituted or unsubstituted aromatic group, $R_2$ represents a group chosen from: a hydrogen atom, a linear or branched hydrocarbon group of 1 to 40 carbon atoms, comprising one or more heteroatoms and optionally comprising one or more unsaturations, or a substituted or unsubstituted aromatic group, m and n represent independently of each other an integer that varies from 1 to 4, p represents an integer that varies from 0 to 4, q represents an integer that varies from 1 to 4 or a combination of these values, Y represents a group comprising a hydrogen bond donor such as the NH group and a hydrogen bond acceptor such as the C=O group.

Preferably, Y represents a group chosen from the urea —NHCONH—, amide —NHCO—, urethane —OCONH— groups or urea of general formula (II):

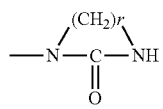

with r an integer having a value of 2 or 3, p having a value of 0 and n having a value of 1. Preferably, the unsaturated fatty acids are unsaturated fatty acids having 4 to 24 carbon atoms ($C_4$ to $C_{24}$), preferably 11 to 22 carbon atoms ($C_{11}$ to $C_{22}$), preferably 16 to 18 carbon atoms ($C_{16}$ to $C_{18}$). More preferably, the unsaturated fatty acids are unsaturated fatty acids having 18 carbon atoms ($C_{18}$), in particular chosen from oleic acid, linoleic acid, linolenic acid taken alone or in a mixture.

Preferably, the organogelling molecule of general formula (I) is in the form of a mixture comprising more than 70% organogelling molecules of general formula (I) with q=2 and/or q=3. Preferably, the $R_1$ and/or $R_2$ group represents an aromatic group substituted by alkyl groups and/or alkoxy groups. In a preferred embodiment, Y represents a urea —NHCONH— group, preferably with n having a value of 1, m and p having a value of 1 or m and p having a value of 2.

In another preferred embodiment, Y represents a urea group of general formula (II):

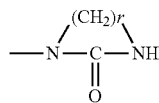

with r an integer having a value of 2 or 3, p having a value of 0 and n having a value of 1, preferably with m having a value of 1, preferably with X representing an NH group. In another preferred embodiment, Y represents an amide —CONH— group, preferably with m and p having a value of 1, preferably with X representing an NH group. In another preferred embodiment, Y represents a urethane —OCONH— group, preferably with m, n and p having a value of 1, preferably with X representing an NH group.

The bituminous composition according to the invention comprises 0.1 to 30% by mass organogelling molecule of general formula (I), preferably 0.5 to 20%, preferably 1 to 10%, preferably 2 to 5%. Preferably, the bituminous composition also comprises at least one polymer and/or one flux (fluxing agent). Preferably, the bitumen is chosen from bitumens of natural origin, bitumens resulting from the refining of crude oil such as atmospheric distillation residues, vacuum distillation residues, visbroken residues, blown residues, mixtures and combinations thereof or synthetic bitumens.

The invention relates moreover to the use of a bituminous composition for manufacturing an anhydrous or emulsified bituminous binder, a polymeric bitumen, or a fluxed bitumen. The invention also relates to the use of a bituminous composition in a mixture with aggregates for manufacturing a surface dressing, a hot mix, a cold mix, a cold-cast mix, a gravel emulsion or a wearing course. The invention also relates to the use of a bituminous composition for manufacturing a sealing coat, a membrane or an impregnation layer. The invention finally relates to the use of at least one organogelling molecule of general formula (I) taken alone or in a mixture for preparing thermoreversibly crosslinked elastic bituminous compositions.

Finally, a subject of the invention is a process for obtaining a bituminous composition in which the organogelling molecule of general formula (I) taken alone or in a mixture is introduced hot, at temperatures between 70 and 220° C., preferably between 90 to 180° C., into the bitumen alone, into the polymeric bitumen, into the anhydrous or emulsified bituminous binder, or into the mix. The invention also relates to a process for the preparation of a bituminous composition in which:

a) a bitumen is introduced into a receiving vessel equipped with mixing means, and the bitumen is heated to a temperature between 70 and 220° C., preferably between 90 and 180° C., b) 0.1 to 30%, preferably 0.5 to 5% by mass organogelling molecule of general formula (I) taken alone or in a mixture in relation to the mass of bitumen is introduced, c) the bituminous composition is heated to a temperature comprised between 70 and 220° C., preferably between 90 and 180° C., under stirring, until a homogeneous bituminous composition is obtained.

DETAILED DESCRIPTION

The organogelling molecules according to the invention are represented by the following general formula (I):

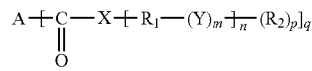

where:

A represents an acyclic, cyclic or polycyclic, saturated or unsaturated, linear or branched hydrocarbon group of 3 to 92 carbon atoms, resulting from the polymerization of the side chains of at least one unsaturated fatty acid, X represents an NH group or an oxygen atom, $R_1$ represents a group chosen from: a linear or branched hydrocarbon group of 2 to 40 carbon atoms, optionally comprising one or more heteroatoms and optionally comprising one or more unsaturations, or a substituted or unsubstituted aromatic group, $R_2$ represents a group chosen from: a hydrogen atom, a linear or branched hydrocarbon group of 1 to 40 carbon atoms, comprising one or more heteroatoms and optionally comprising one or more unsaturations, or a substituted or unsubstituted aromatic group, m and n represent independently of each other an integer that varies from 1 to 4, p represents an integer that varies from 0 to 4, q represents an integer that varies from 1 to 4 or a combination of these values, Y represents a group comprising a hydrogen bond donor such as the NH group and a hydrogen bond acceptor such as the C=O group.

The A group according to the invention results from the polymerization of the side chains of at least one unsaturated fatty acid. The unsaturated fatty acids used are unsaturated fatty acids of 4 to 24 carbon atoms ($C_4$ to $C_{24}$), preferably 11 to 22 carbon atoms ($C_{11}$ to $C_{22}$), preferably 16 to 18 carbon atoms ($C_{16}$ to $C_{18}$). Among the unsaturated fatty acids used, there may be mentioned, for example, crotonic acid ($C_4$), isocrotonic acid ($C_4$), undecylenic acid ($C_{11}$), hypogeic acid ($C_{16}$), palmitoleic acid ($C_{16}$), oleic acid ($C_{18}$), elaidic acid ($C_{18}$), vaccenic acid ($C_{18}$), petroselinic acid ($C_{18}$), gadoleic acid ($C_{20}$), gondoic acid ($C_{20}$), cetoleic acid ($C_{22}$), erucidic acid ($C_{22}$), brassidic acid ($C_{22}$), nervonic acid ($C_{24}$), tiglic acid ($C_5$), sorbic acid ($C_6$), linoleic acid ($C_{18}$), hiragonic acid ($C_{16}$), linolenic acid ($C_{18}$), γ-linolenic acid ($C_{18}$), eleostearic acid ($C_{18}$), parinaric acid ($C_{18}$), homo-γ-linolenic acid ($C_{20}$), arachidonic acid ($C_{20}$), clupanodonic acid ($C_{22}$) taken alone or in a mixture.

Preferably, the unsaturated fatty acids are unsaturated fatty acids of 18 carbon atoms ($C_{18}$), in particular chosen from oleic acid, linoleic acid, linolenic acid taken alone or in a mixture. It is also possible to polymerize the acids resulting from TOFA (Tall Oil Fatty Acid) (—rich in oleic acids and linoleic acids) and to polymerize the fatty acids that it contains. It is possible to polymerize a mixture containing the same fatty acid or a mixture containing several different fatty acids.

The reaction making it possible to polymerize the fatty acid chains is a Diels-Alder reaction (for more information see Kirk Othmer Encyclopedia of Chemical Technology, Vol 7, p. 768 or "The dimer acids", Humko Sheffield, 1975). The polymerization reaction is a dimerization, trimerization or tetramerization reaction in which fatty acid dimers (or diacid dimers) of the fatty acid trimers (or triacid trimers) or fatty acid tetramers (or tetracid tetramers) respectively are obtained. Traces of unreacted fatty acids may also be present.

Depending on the experimental conditions used, a mixture is therefore obtained containing unreacted fatty acids (A-$(COOH)_q$ with q=1), or fatty acid dimers (A-$(COOH)_q$ with q=2), or fatty acid trimers (A-$(COOH)_q$ with q=3), or fatty acid tetramers (A-$(COOH)_q$ with q=4) at different concentrations, A having the meaning given previously. The organogelling molecules of general formula (I) obtained by this polymerization reaction are therefore in the form of a mixture where organogelling molecules of general formula (I) coexist, where the integer q has a value of 1, 2, 3 and/or 4. The reaction product comprises mostly fatty acid dimers (q=2) and fatty acid trimers (q=3), the unreacted fatty acids (q=1) or fatty acid tetramers (q=4) being minority products. According to a preferred embodiment, the organogelling molecules of general formula (I) are therefore in the form of a mixture comprising more than 70% organogelling molecules of general formula (I) with q=2 and/or q=3, i.e. the polymerization reaction leads to a mixture comprising more than 70% fatty acid dimer and/or fatty acid trimer. More preferentially, the organogelling molecules of general formula (I) are in the form of a mixture comprising more than 80% organogelling molecules of general formula (I) with q=2 and/or q=3.

The reaction products are in the form of acyclic compounds (linear or branched), cyclic compounds or polycyclic compounds (in particular bicyclic). When unreacted fatty acids remain (A-$(COOH)_q$ with q=1), the A group is a linear acyclic hydrocarbon group of 3 to 23 carbon atoms ($C_4$ to $C_{24}$ fatty acids), preferably 15 to 21 carbon atoms ($C_{16}$ to $C_{22}$ fatty acids), preferably 17 to 19 carbon atoms ($C_{18}$ to $C_{20}$ fatty acids).

For the fatty acid dimers, the fatty acid trimers and the fatty acid tetramers, the A group is a branched acyclic or cyclic or polycyclic hydrocarbon group. For the fatty acid dimers, the A group is a branched acyclic or cyclic or polycyclic hydrocarbon group of 6 to 46 carbon atoms ($C_4$ to $C_{24}$ fatty acid dimers), preferably 30 to 42 carbon atoms ($C_{16}$ to $C_{22}$ fatty acid dimers), preferably 34 to 38 carbon atoms ($C_{18}$ to $C_{20}$ fatty acid dimers). For the fatty acid trimers, the A group is a branched acyclic or cyclic or polycyclic hydrocarbon group of 9 to 69 carbon atoms ($C_4$ to $C_{24}$ fatty acid trimers), prefer-ably 45 to 63 carbon atoms ($C_{16}$ to $C_{22}$ fatty acid trimers), preferably 51 to 57 carbon atoms ($C_{18}$ to $C_{20}$ fatty acid trimers). For the fatty acid tetramers, the A group is a branched acyclic or cyclic or polycyclic hydrocarbon group of 12 to 92 carbon atoms ($C_4$ to $C_{24}$ fatty acid tetramers), preferably 60 to 84 carbon atoms ($C_{16}$ to $C_{22}$ fatty acid tetramers), preferably 68 to 76 carbon atoms ($C_{18}$ to $C_{20}$ fatty acid tetramers).

The A group is a saturated group when the polymerization reaction is followed by a selective hydrogenation reaction of the double bonds. By way of example, starting from linoleic acid, or oleic acid or Tall Oil Fatty Acid, comprising mostly $C_{18}$ fatty acids of 18 carbon atoms, it is possible to obtain a mixture comprising the following acid dimers (A-$(COOH)_q$ with q=2):

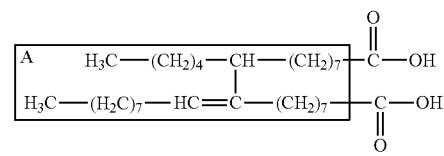

acyclic compound

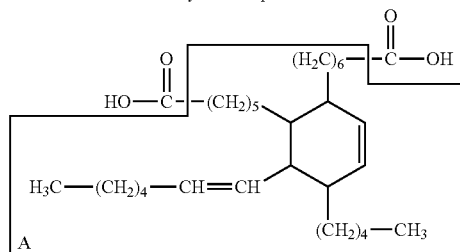

cyclic compound

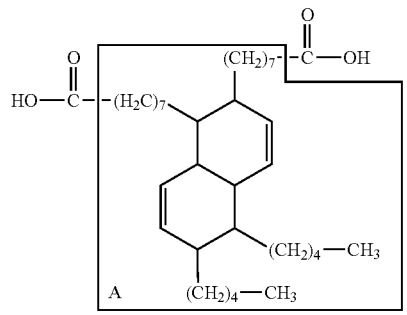

bicyclic compound

The above three A-$(COOH)_2$ compounds have two acid functions and the A group according to the invention.

In the example above, the A group can be in three forms:

in the acyclic compound, A is an unsaturated, branched, hydrocarbon group of 34 carbon atoms, in the cyclic compound, A is an unsaturated, cyclic, hydrocarbon group of 34 carbon atoms, in the bicyclic compound, A is an unsaturated, polycyclic, hydrocarbon group of 34 carbon atoms.

The organogelling molecule is therefore in the form of a mixture at integer q (mixture of fatty acid dimers and/or of fatty acid trimers for example) and also in the different chemical forms that a fatty acid dimer can assume (mixture of cyclic or bicyclic compounds for example). Among the commercially available polymerized fatty acids, there can be mentioned FRIPOL® marketed by Unichema, POLYMERGIN® products marketed by HARBURGER BRINCKMAN & MERGELL GmbH, DIMER® products marketed by Westvaco and EMPOL® products marketed by Cognis.

For example, EMPOL 1008® comprises 3.5% $C_{18}$ unreacted fatty acid (q=1), 92.3% $C_{36}$ fatty acid dimer (q=2) and 3.5% $C_{54}$ fatty acid trimer (q=3). Furthermore, in EMPOL 1008®, the double bonds are totally hydrogenated. For example, EMPOL 1018® comprises 4% unreacted fatty acid (q=1), 79% fatty acid dimer (q=2) and 17% fatty acid trimer (q=3). For example, EMPOL 1040® comprises 20% $C_{36}$ fatty acid dimer (q=2) and 80% $C_{54}$ fatty acid trimer (q=3). For example, EMPOL 1041® comprises 10% $C_{36}$ fatty acid dimer (q=2) and 90% $C_{54}$ fatty acid trimer (q=3). For example, EMPOL 1054® comprises 4% $C_{18}$ unreacted fatty acid (q=1), 55% $C_{36}$ fatty acid dimer (q=2) and 35% $C_{54}$ fatty acid trimer (q=3). For example, PRIPOL 1045® comprises 10% $C_{36}$ fatty acid dimer (q=2) in and 90% $C_{54}$ fatty acid trimer (q=3).

The A groups, due to their dissymmetry and their irregularity of structure exhibit little or even no cristallinity. Furthermore, due to the presence of the numerous alkyl chains, they have a low glass transition temperature Tg (close to 20° C. or below 20° C.). This low glass transition temperature gives the molecules (I) a degree of flexibility, they are capable of deforming without breaking. The combination of the A units and the hydrogen bonds contributed by the Y units makes it possible for the molecules (I) to be deformable, but return to their initial state (elasticity) after elongation.

The Y group of molecules of general formula (I) comprises at least one hydrogen bond donor group and at least one hydrogen bond acceptor group which can form hydrogen bonds. The hydrogen bond donor is for example an NH group and the hydrogen bond acceptor is for example the C=O carbonyl group. The NH and C=O functions are found in particular in the urea, amide or urethane groups. The Y group is therefore chosen from the urea —NHCONH—, amide —NHCO—, urethane —OCNH— or urea groups of general formula (II):

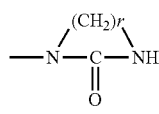

with r an integer having a value of 2 or 3 and p having a value of 0.

The urea —NHCONH—, amide —NHCO—, urethane —OCNH— or urea groups of general formula (II) of the Y group allow the organogelling molecules (I) to combine with each other via a network of hydrogen bonds. At temperatures of use (between −20° C. and +60° C.) the combination of the organogelling molecules (I) gives the bitumen improved properties in terms of hardness and elasticity. When the bituminous composition is heated to application temperatures (between +90° C. and +180° C.), the interactions between organogelling molecules (I) disappear, and the bitumen assumes the properties of a non-crosslinked bitumen, the viscosity of the bituminous composition when hot returns to that of the original bitumen. Thus, when the organogelling molecules (I) according to the invention are added to a bitumen, bituminous compositions are obtained which are reversibly and more particularly thermoreversibly crosslinked.

By thermoreversible crosslinking of the bituminous compositions according to the invention, is meant a crosslinking which is reflected in the following phenomena:

at low temperature, for example at temperatures of use, the organogelling molecules (I) are combined with each other via a network of hydrogen bonds obtained thanks to the Y units. The supramolecular network formed gives the bitumen improved mechanical properties in terms of hardness and elasticity.

at high temperature, for example at application temperatures, an increase in temperature causes the network of hydrogen bonds to break and as a result the dissociation of the supramolecular network. The closeness of the organogelling molecules (I) disappears and the bituminous composition assumes a low viscosity and therefore a good fluidity.

a reduction in temperature, and a return to temperatures of use, allow the network of hydrogen bonds to re-form. The phenomenon is thermoreversible.

The $R_1$ and $R_2$ groups represent independently of each other a linear or branched hydrocarbon group respectively of 2 or 1 carbon atoms to 40 carbon atoms, optionally comprising one or more heteroatoms and optionally comprising one or more unsaturations, or a substituted or unsubstituted aromatic group. As the $R_2$ group is at the end of the chain it can moreover represent a hydrogen atom, which is not the case for $R_1$. Preferably the $R_1$ and/or $R_2$ groups are unsaturated linear groups, preferably of 2 to 24 carbon atoms, preferably 5 to 18 carbon atoms, more preferably 6 to 12 carbon atoms. Preferably the $R_1$ and/or $R_2$ groups are unsubstituted aromatic groups. When $R_1$ and/or $R_2$ represents a substituted aromatic group, the aromatic group is substituted by alkyl groups, preferably methyl, ethyl, propyl, butyl groups and/or substituted by alkoxy groups, preferably methoxy, ethoxy, propoxy, butoxy groups. When $R_1$ and/or $R_2$ comprise one or more heteroatoms, the heteroatoms are preferably nitrogen atoms, more preferably $R_1$ and/or $R_2$ comprise a single nitrogen atom.

In a particular embodiment, the Y group represents a urea —NHCONH— group, the general formula (I) is written as follows (Ia):

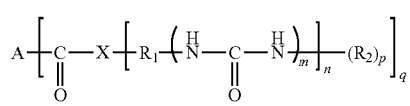

where the A, $R_1$, $R_2$ groups and the integers m, n, p and q have the same meaning as previously.

Preferably, the integers m, n and p have a value of 1, preferably X represents an NH group, and the molecules corresponding to the following formula ($Ia_1$) are used:

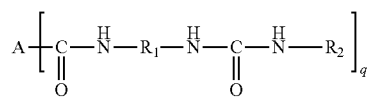

where the A, $R_1$, $R_2$ groups and the integer q have the same meaning as previously.

In particular, the molecules ($Ia_1$) in the following table are used:

| Molecule (Ia₁) | $R_1$ | $R_2$ |
|---|---|---|
| A—[C(=O)—NH—(CH₂)₆—NH—C(=O)—NH—C₆H₅]_q | $(CH_2)_6$ | phenyl |
| A—[C(=O)—NH—C₆H₄—NH—C(=O)—NH—(CH₂)₁₁—CH₃]_q | phenyl | $(CH_2)_{11}-CH_3$ |
| A—[C(=O)—NH—(CH₂)₆—NH—C(=O)—NH—(CH₂)₇—CH₃]_q | $(CH_2)_6$ | $(CH_2)_7-CH_3$ |

The molecules (Ia₁) are synthesized from a commercial mixture resulting from the polymerization of fatty acids of general formula (III) A-[COOH]_q, the A group and the integer q have the same meaning as previously. The acid function(s) of the compound of general formula (III) react first with a diamine of formula (IV) H₂N—R₁—NH₂. The remaining amine functions then react with an isocyanate of general formula (V) O=C=N—R₂, and the R₁ and R₂ groups have the same meaning as previously.

Preferably, the integers m, n and p have a value of 1, preferably X represents an oxygen atom O, and the molecules corresponding to the following formula (Ia₂) are used:

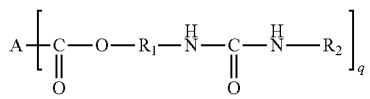

where the A, R₁, R₂ groups and the integer q have the same meaning as previously.

In particular, the molecules (Ia₂) of the following table are used:

| Molecule (Ia₂) | $R_1$ | $R_2$ |
|---|---|---|
| A—[C(=O)—O—CH₂CH₂—NH—C(=O)—NH—H]_q | $(CH_2)_2$ | H |

-continued

| Molecule (Ia₂) | $R_1$ | $R_2$ |
|---|---|---|
| 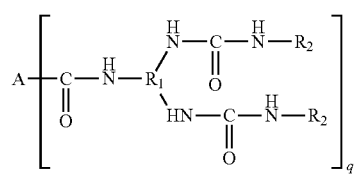 | $(CH_2)_6$ | phenyl |

The molecules (Ia₂) are synthesized from a commercial mixture resulting from the polymerization of fatty acids of general formula (III) A-[COOH]_q, the A group and the integer q have the same meaning as previously. The acid function(s) of the compound of general formula (III) are first activated in acyl chloride to form A-[COCl]_q which then reacts with a compound of formula (VI) HO—R₁—NHCONH—R₂, the R₁ and R₂ groups have the same meaning as previously.

Preferably, the integer n has a value of 1, preferably the integers m and p have a value of 2, preferably X represents an NH group, and the molecules corresponding to the following formula (Ia₃) are used:

where the A, R₁, R₂ groups and the integer q have the same meaning as previously.

In particular, the molecules (Ia₃) of the following table are used:

| Molecule (Ia₃) | $R_1$ | $R_2$ |
|---|---|---|
| 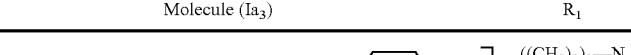 | $((CH_2)_2)_3-N$ | phenyl |

| Molecule (Ia₃) | R₁ | R₂ |
|---|---|---|
| 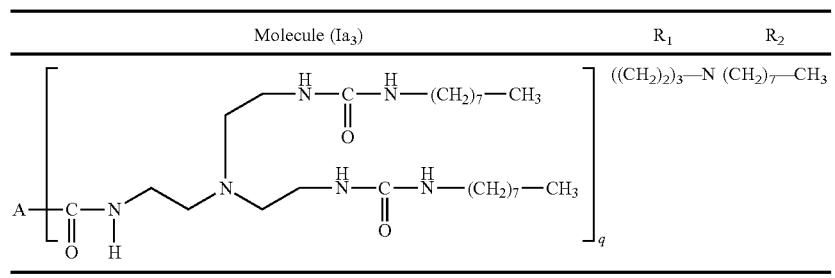 | ((CH₂)₂)₃—N | (CH₂)₇—CH₃ |

The molecules (Ia₃) are synthesized from a commercial mixture resulting from the polymerization of fatty acids of general formula (III) A-[COOH]$_q$, the A group and the integer q have the same meaning as previously. The acid function(s) of the compound of general formula (III) react first with a triamine of formula (VII) (H₂N)₃—R₁. The remaining amine functions then react with an isocyanate of general formula (V) O=C=N—R₂, R₁ and R₂ have the same meaning as previously.

In a second particular embodiment, the group Y represents a urea group of formula (II):

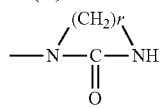

where r is an integer having a value of 2 or 3. In this embodiment, p has a value of 0 and n has a value of 1, and the general formula (I) is written as follows (Ib):

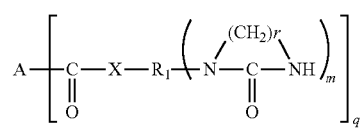

where the A and R₁ groups and the integers m and q have the same meaning as previously.

Preferably, the integer m has a value of 1, preferably X represents an NH group, and the general formula (Ib) is written as follows (Ib₁):

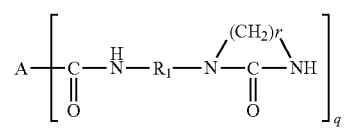

where the A and R₁ groups and the integer q have the same meaning as previously.

In particular, the molecules (Ib₁) of the following table are used:

| Molecule (Ib₁) | R₁ | r |
|---|---|---|
| A—[C(=O)—NH—CH₂—CH₂—N(−CH₂CH₂−)C(=O)NH]$_q$ | (CH₂)₂ | 2 |
| A—[C(=O)—NH—CH₂—CH₂—NH—CH₂—CH₂—N(−CH₂CH₂−)C(=O)NH]$_q$ | (CH₂)₂—NH—(CH₂)₂ | 2 |

The preparation of the molecules (Ib₁) is described in the application WO2006087475.

Among the preferred molecules of the sub-family (Ib₁), there may be mentioned the following molecule (Ib₁-1), in which A is a saturated cyclic hydrocarbon group of 32 carbon atoms which results from the dimerization of fatty acids rich in linoleic acid:

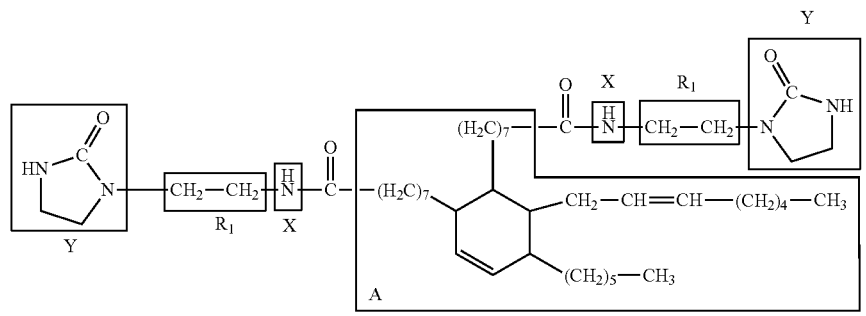

In a third particular embodiment, the Y group represents an amide —CONH— group, and the general formula (I) is written as follows (Ic):

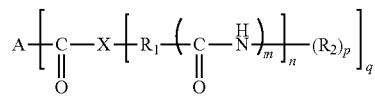

where the A, $R_1$, $R_2$ groups and the integers m, n, p and q have the same meaning as previously.

Preferably, the integers m and p have a value of 1, preferably X represents an NH group, and the general formula (Ic) is written as follows ($Ic_1$):

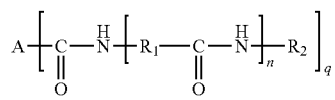

where the A, $R_1$, $R_2$ groups and the integers n and q have the same meaning as previously.

In particular, the molecules ($Ic_1$) of the following table are used:

The molecules ($Ic_1$) are synthesized from a commercial mixture resulting from the polymerization of fatty acids of general formula (III) A-[COOH]$_q$, and the A group and the integer q have the same meaning as previously. The acid function(s) of the compound of general formula (III) react with a compound of formula (VIII) $H_2N$—($R_1$—CONH)$_n$—$R_2$, and the groups $R_1$ and $R_2$ and the integer n have the same meaning as previously.

In a last particular embodiment, the Y group represents a urethane —OCONH— group, and the general formula (I) is written as follows (Id):

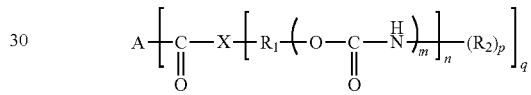

where the A, $R_1$, $R_2$ groups and the integers m, n, p and q have the same meaning as previously.

Preferably, the integers m, n and p have a value of 1, preferably X represents an NH group, and the molecules corresponding to the following formula ($Id_1$) are used:

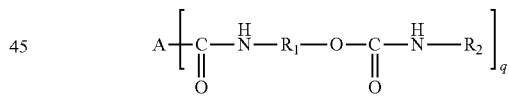

where the A, $R_1$, $R_2$ groups and the integer q have the same meaning as previously.

In particular, the molecules ($Id_1$) of the following table are used:

| Molecule ($Ic_1$) | n | $R_1$ | $R_2$ |
|---|---|---|---|
| $A\text{-}[C(=O)\text{-}N(H)\text{-}((CH_2)_5\text{-}C(=O)\text{-}N(H))_2\text{-}(CH_2)_{11}\text{-}CH_3]_q$ | 2 | $(CH_2)_5$ | $(CH_2)_{11}$—$CH_3$ |
| $A\text{-}[C(=O)\text{-}N(H)\text{-}((CH_2)_{10}\text{-}C(=O)\text{-}N(H))_4\text{-}phenyl]_q$ | 4 | $(CH_2)_{10}$ | phenyl |

| Molecule (Id$_1$) | R$_1$ | R$_2$ |
|---|---|---|
| A$-$[C($=$O)$-$N(H)$-$(CH$_2$)$_6$$-$O$-$C($=$O)$-$N(H)$-$C$_6$H$_5$]$_q$ | (CH$_2$)$_6$ | phenyl |
| A$-$[C($=$O)$-$N(H)$-$(CH$_2$)$_5$$-$O$-$C($=$O)$-$N(H)$-$C$_6$H$_5$]$_q$ | (CH$_2$)$_5$ | phenyl |
| A$-$[C($=$O)$-$N(H)$-$(CH$_2$)$_2$$-$O$-$C($=$O)$-$N(H)$-$(CH$_2$)$_7$$-$CH$_3$]$_q$ | (CH$_2$)$_2$ | (CH$_2$)$_7$—CH$_3$ |

The molecules (Id$_1$) are synthesized from a commercial mixture resulting from the polymerization of fatty acids of general formula (III) A-[COOH]$_q$, the A group and the integer q have the same meaning as previously. The acid function(s) of the compound of general formula (III) react first with a compound of formula (IX) H$_2$N—R$_1$—OH. The remaining alcohol functions then react with an isocyanate of general formula (V) O=C=N—R$_2$, the R$_1$ and R$_2$ groups have the same meaning as previously.

According to the invention, it is possible to combine the different preferred embodiments and to have for example molecules of formula (Ia) mixed with molecules of formula (Ib), or mixed with molecules of formula (Ic), or mixed with molecules of formula (Id). Still according to the invention, the chemical synthesis of the molecules of general formula (I), is sometimes accompanied by by-products but it is not necessary to separate the products of general formula (I) from the reaction by-products, products which are in the minority.

The bituminous compositions according to the invention comprise at least one bitumen and at least one organogelling molecule of general formula (I) taken alone or in a mixture. The bituminous compositions according to the invention comprise 0.1 to 30% by mass organogelling molecule of general formula (I) taken alone or in a mixture, preferably 0.5 to 20%, preferably 1 to 10%, preferably 2 to 5%. The bituminous compositions according to the invention can contain bitumens of different origins. There may be mentioned firstly bitumens of natural origin, those contained in deposits of natural bitumen, natural asphalt or bituminous sands.

The bitumens according to the invention are also the bitumens resulting from the refining of crude oil. The bitumens result from the atmospheric and/or vacuum distillation of oil. These bitumens being able to be optionally blown, visbroken and/or de-asphalted. The bitumens can be bitumens of hard or soft grade. The different bitumens obtained by the refining processes can be combined with each other in order to obtain the best technical compromise. The bitumens used can also be bitumens fluxed by the addition of volatile solvents, fluxes originating from oil, carbochemical fluxes and/or fluxes of vegetable origin.

It is also possible to use synthetic bitumens also called clear, pigmentable or colourable bitumens. These bitumens contain few or no asphaltenes and can as a result be coloured. These synthetic bitumens are based on petroleum resin and/or resin resulting from petrochemical processes such as polyethylene waxes or coumarone-indene resins and lubricating oil as described for example in the patent EP 179510. Polymeric bitumens can also be used. The polymers used can be for example polyethylenes, ethylene and vinyl acetate copolymers, styrene and butadiene copolymers.

Various uses of the bituminous compositions obtained according to the invention are envisaged, in particular for the preparation of a bituminous binder, which can in turn be used for preparing a combination with aggregates, in particular for use on roads. Another aspect of the invention is the use of a bituminous composition in various industrial applications, in particular for preparing a sealing membrane, membrane or an impregnation layer. With regard to road applications, the invention relates in particular to bituminous mixes as materials for the construction and maintenance of road foundations and their surfacing, as well as for carrying out all road works. Thus, the invention relates for example to surface dressings, hot mixes, cold mixes, cold-cast mixes, gravel emulsions, base, binder, bonding and wearing courses, and other combinations of a bituminous binder and road aggregate having particular properties such as anti-rutting courses, draining mixes, or asphalts (mixture of a bituminous binder and sand-type aggregates). With regard to the industrial applications of the bituminous compositions, the following can be mentioned: the production of sealing membranes, anti-noise membranes, insulating membranes, surface coatings, carpet tiles, impregnation layers, etc.

The invention also relates to a process for obtaining a bituminous composition which is hard and elastic at temperatures of use without increasing its viscosity when hot. The process for the preparation of the bituminous compositions of the invention comprises the following essential stages:

a) a bitumen is introduced into a receiving vessel equipped with mixing means, and the bitumen is heated to a temperature between 70 and 220° C., preferably between 90 and 180° C., b) 0.1 to 30%, preferably 0.5 to 5% by weight organogelling molecule of general formula (I) is introduced, c) the composition is heated to a temperature comprised between 70 and 220° C., preferably between 90 and 180° C., under stirring, until a homogeneous bituminous composition is obtained.

The organogelling molecule of general formula (I) can be introduced equally well into the bitumen alone, or during production, into the polymeric bitumen, into the anhydrous or emulsified bituminous binder, into the mix, but always hot, at temperatures between 70 and 220° C., preferably between 90 to 180° C. The mixtures can then be stirred at these temperatures until the organogelling molecule of general formula (I) dissolves in the bitumen, the polymeric bitumen, the anhydrous or emulsified bituminous binder, into the mix.

EXAMPLES

Bituminous Composition $T_1$ (Control)
A straight-run bitumen of penetrability 50$^1$/10 mm according to the standard NF EN 1426 is chosen.

Bituminous Composition $T_2$ (Control)
A control bituminous composition is also prepared in which the polymer is irreversibly crosslinked.
The following are introduced into a reactor under stirring and at 195° C.:

95% by mass straight-run bitumen of penetrability 50$^1$/10 mm and

5% by mass sequenced styrene-butadiene copolymer, comprising 25% by weight styrene and 75% by weight butadiene having a molecular mass by weight, Mw of 128,000 Dalton.

The mixture is stirred and heated at 195° C. for approximately 3 hours.

0.1% by mass sulphur is then added.

The mixture is stirred and heated at 195° C. for 1 hour.

Bituminous Compositions According to the Invention $C_1$, $C_2$, $C_3$, $C_4$, $C_5$ 5 bituminous compositions according to the invention are prepared with 3 molecules of general formula (I).

1) For the composition $C_1$, the molecule ($Ib_1$-2) is used, the formula of which is as follows:

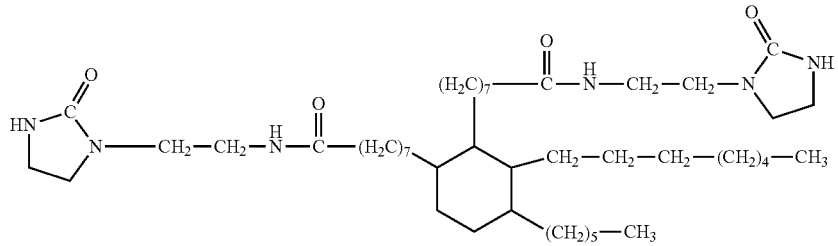

The molecule ($Ib_1$-2) is prepared as described in the application WO2006087475 (pages 12 to 14).

The concentration of molecule ($Ib_1$-2) in the composition $C_1$ is 0.5% by mass.

2) For the composition $C_2$, the same molecule ($Ib_1$-2) is used at a concentration of 2% by mass.

3) For the composition $C_3$, the same molecule ($Ib_1$-2) is used at a concentration of 5% by mass.

4) For the composition $C_4$, the molecule ($Ia_1$-I) is used the formula of which is as follows:

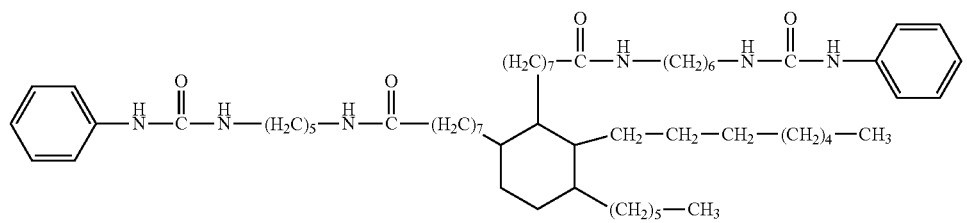

The molecule ($Ia_1$-1) is prepared as follows:

51.5 g of EMPOL 1008® (92.3% $C_{36}$ fatty acid dimer; q=2, totally hydrogenated) and 21.4 g of hexamethylene diamine are mixed in a reactor. The mixture is heated at 160° C. for 24 hours.

After cooling to ambient temperature, 70 mL of chloroform, then 20 mL of phenylisocyanate are added. The mixture is stirred for 24 hours at ambient temperature, then the solvent is evaporated off.

The concentration of molecule ($Ia_1$-1) in the composition $C_4$ is 5% by mass.

5) For the composition $C_5$, the molecule ($Id_1$-1) is used, the formula of which is as follows:

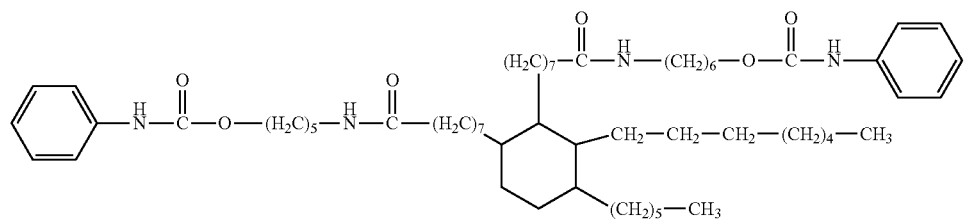

The molecule (Id$_1$-I) is prepared as follows:
51.5 g of EMPOL 1008® (92.3% $C_{36}$ fatty acid dimer, q=2, totally hydrogenated) and 19 g of 5-amino-I-pentanol are mixed in a reactor. The mixture is heated at 160° C. for 24 hours.
After cooling down to 50° C., 70 mL of chloroform, 1 mL of triethylamine, then 20 mL of phenylisocyanate are added. The mixture is stirred at reflux for 24 hours, then the solvent is evaporated off.
The concentration of molecule (Id$_1$-I) in the composition $C_5$ is 5% by mass.
The bituminous compositions according to the invention $C_1$ to $C_5$ are prepared as follows:
The following are introduced into a reactor under stirring and at 170° C.:
   a straight-run bitumen of penetrability 50 1/10 mm and
   the molecule of general formula (I).
The mixture is stirred and heated at 170° C. for approximately 2 hours.
The table below shows the physical characteristics of the bituminous compositions according to the invention and of the control bituminous compositions.

|  | $T_1$ | $T_2$ | $C_1$ | $C_2$ | $C_3$ | $C_4$ | $C_5$ |
|---|---|---|---|---|---|---|---|
| Penetrability (0.1 mm) [1] | 46 | 43 | 46 | 45 | 41 | 39 | 42 |
| RBT (° C.) [2] | 50.2 | 61.6 | 51.4 | 53.7 | 65.0 | 62 | 59 |
| Viscosity at 80° C. (Pa · s) | 28.4 | 59.0 | 29.3 | 31.5 | 55.0 | 57.0 | 39.9 |
| Viscosity at 100° C. (Pa · s) | 5.3 | 14.9 | 5.8 | 7.6 | 8.3 | 10.0 | 8.0 |
| Viscosity at 120° C. (Pa · s) | 1.3 | 4.3 | 1.5 | 1.8 | 2.1 | 2.5 | 1.9 |
| Viscosity at 140° C. (Pa · s) | 0.5 | 1.5 | 0.5 | 1.6 | 0.9 | 1.0 | 0.8 |
| Viscosity at 160° C. (Pa · s) | 0.2 | 0.6 | 0.3 | 0.5 | 0.5 | 0.4 | 0.3 |
| Viscosity at 180° C. (Pa · s) | 0.1 | 0.4 | 0.2 | 0.2 | 0.1 | 0.2 | 0.2 |
| Viscosity at 200° C. (Pa · s) | 0.1 | 0.2 | 0.2 | 0.2 | 0.1 | 0.2 | 0.1 |
| Max. elongation at 5° C. (%) [3] | 38 | 697 | 75 | 100 | 589 | >700 | 322 |
| Conventional energy at 400% elongation (J/cm$^2$) [3] | 0 | 17.5 | 0 | 0 | 12.7 | 13.8 | 3.7 |

[1] According to the standard NF EN 1426.
[2] Ring and Ball Temperature, according to the standard NF EN 1427.
[3] Traction test at 5° C., according to the standard NF EN 13587, with a stretching rate of 500 mm/min.

The bitumen alone $T_1$ is not at all elastic. When a polymer crosslinked with sulphur (irreversible crosslinking) is added to the bitumen, the composition $T_2$ has a very good elongation capacity and a cohesion, measured by the conventional energy, very clearly greater than that of the bitumen alone $T_1$; the composition $T_2$ is elastic. The composition $T_2$ however has much higher viscosity values than those of the bitumen alone, this being due to the irreversible crosslinking of the polymer.

The compositions according to the invention and in particular the compositions $C_3$ and $C_4$ have significant elastic properties at 5° C., properties close to and even superior to those of the composition $T_2$. Furthermore, it appears that the compositions according to the invention have relatively reduced viscosities, fairly close to that of the pure bitumen $T_1$, as soon as the temperature exceeds 100° C. The viscosities of the compositions according to the invention are very clearly lower than those of the composition $T_2$ in which the crosslinking is irreversible. The compositions according to the invention are therefore sufficiently fluid at application temperatures thus allowing good coating of the aggregates and easier application of the mixes to the road with current technical road construction means. Furthermore the compositions according to the invention at temperatures of use are sufficiently elastic to resist the deformations caused by traffic and/or changes in temperature.

The invention claimed is:

1. A bituminous composition comprising at least one bitumen and at least one organogelling molecule taken alone or in a mixture, said organogelling molecule being represented by the following general formula (I):

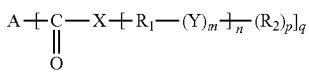

where:
  A represents an acyclic, cyclic or polycyclic, saturated or unsaturated, linear or branched hydrocarbon group of 3 to 92 carbon atoms, resulting from the polymerization of the side chains of at least one unsaturated fatty acid;
  X represents an NH group or an oxygen atom O;
  $R_1$ represents a group chosen from: a linear or branched hydrocarbon group of 2 to 40 carbon atoms, optionally comprising one or more heteroatoms and optionally comprising one or more unsaturations, or a substituted or unsubstituted aromatic group;
  $R_2$ represents a group chosen from: a hydrogen atom, a linear or branched hydrocarbon group of 1 to 40 carbon atoms, comprising one or more heteroatoms and optionally comprising one or more unsaturations, or a substituted or unsubstituted aromatic group;
  m and n represent independently of each other an integer that varies from 1 to 4;
  p represents an integer that varies from 0 to 4;
  q represents an integer that varies from 1 to 4 or a combination of these values; and
  Y represents a group comprising a hydrogen bond donor and a hydrogen bond acceptor.

2. The bituminous composition according to claim 1 in which Y represents a group chosen from the urea —NH-CONH—, amide —NHCO—, urethane —OCONH— groups or urea of general formula (II):

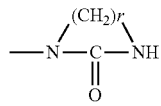

with r an integer having a value of 2 or 3 and p having a value of 0 and n having a value of 1.

3. The bituminous composition according to claim 1 in which the unsaturated fatty acids are unsaturated fatty acids of 4 to 24 carbon atoms ($C_4$ to $C_{24}$).

4. The bituminous composition according to claim 1 in which the unsaturated fatty acids are unsaturated fatty acids of 18 carbon atoms ($C_{18}$).

5. The bituminous composition according to claim 1 in which the organogelling molecule of general formula (I) is in the form of a mixture comprising more than 70% organogelling molecules of general formula (I) with q=2 and/or q=3.

6. The bituminous composition according to claim 1 in which the $R_1$ and/or $R_2$ group represents an aromatic group substituted by alkyl groups and/or alkoxy groups.

7. The bituminous composition according to claim 1 in which Y represents a urea —NHCONH— group, with n having a value of 1, m and p having a value of 1 or m and p having a value of 2.

8. The bituminous composition according to claim 1 in which Y represents a urea group of general formula (II):

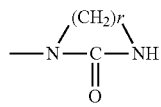

with r an integer having a value of 2 or 3, p having a value of 0 and n having a value of 1, with m having a value of 1, and with X representing an NH group.

9. The bituminous composition according to claim 1 in which Y represents an amide —CONH— group, with m and p having a value of 1, and with X representing an NH group.

10. The bituminous composition according to claim 1 in which Y represents a urethane —OCONH— group, with m, n and p having a value of 1, and with X representing an NH group.

11. The bituminous composition according to claim 1 further comprising 0.1 to 30% by mass organogelling molecule of general formula (I).

12. The bituminous composition according to claim 1 wherein the bitumen also comprises at least one polymer and/or one flux.

13. The bituminous composition according to claim 1 in which the bitumen is chosen from bitumens of natural origin, bitumens resulting from the refining of crude oil, or combinations thereof.

14. A method for manufacturing an anhydrous or emulsified bituminous binder, a polymeric bitumen or a fluxed bitumen comprising generating the bituminous composition according to claim 1.

15. A method for manufacturing a surface dressing, a hot mix, a cold mix, a cold-cast mix, a gravel emulsion or a wearing course comprising mixing the bituminous composition according to claim 14 with aggregates.

16. A method for manufacturing a sealing coat, a membrane or an impregnation layer comprising mixing the bituminous composition according to claim 14 with aggregates.

17. A method for preparing thermoreversibly crosslinked elastic bituminous compositions comprising combining at least one organogelling molecule of general formula (I) taken alone or in a mixture, with a bitumen, wherein general formula (I) is

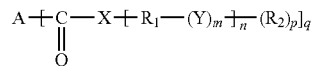

where:
A represents an acyclic, cyclic or polycyclic, saturated or unsaturated, linear or branched hydrocarbon group of 3 to 92 carbon atoms, resulting from the polymerization of the side chains of at least one unsaturated fatty acid;
X represents an NH group or an oxygen atom O;
$R_1$ represents a group chosen from: a linear or branched hydrocarbon group of 2 to 40 carbon atoms, optionally comprising one or more heteroatoms and optionally comprising one or more unsaturations, or a substituted or unsubstituted aromatic group;
$R_2$ represents a group chosen from: a hydrogen atom, a linear or branched hydrocarbon group of 1 to 40 carbon atoms, comprising one or more heteroatoms and optionally comprising one or more unsaturations, or a substituted or unsubstituted aromatic group;
m and n represent independently of each other an integer that varies from 1 to 4;
p represents an integer that varies from 0 to 4;
q represents an integer that varies from 1 to 4 or a combination of these values; and
Y represents a group comprising a hydrogen bond donor and a hydrogen bond acceptor.

18. A process for obtaining a bituminous composition comprising an organogelling molecule of general formula (I) taken alone or in a mixture, being introduced hot, at temperatures between 70 and 220° C., into bitumen alone, into polymeric bitumen, into an anhydrous or emulsified bituminous binder, or into a mix, wherein general formula (I) is

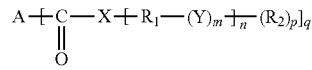

where:
A represents an acyclic, cyclic or polycyclic, saturated or unsaturated, linear or branched hydrocarbon group of 3 to 92 carbon atoms, resulting from the polymerization of the side chains of at least one unsaturated fatty acid;
X represents an NH group or an oxygen atom O;
$R_1$ represents a group chosen from: a linear or branched hydrocarbon group of 2 to 40 carbon atoms, optionally comprising one or more heteroatoms and optionally comprising one or more unsaturations, or a substituted or unsubstituted aromatic group;
$R_2$ represents a group chosen from: a hydrogen atom, a linear or branched hydrocarbon group of 1 to 40 carbon atoms, comprising one or more heteroatoms and optionally comprising one or more unsaturations, or a substituted or unsubstituted aromatic group;

m and n represent independently of each other an integer that varies from 1 to 4;

p represents an integer that varies from 0 to 4;

q represents an integer that varies from 1 to 4 or a combination of these values; and Y represents a group comprising a hydrogen bond donor and a hydrogen bond acceptor.

19. A process for preparing a bituminous composition according to claim 1 further comprising:

a) a bitumen is introduced into a receiving vessel equipped with mixing means, and the bitumen is heated to a temperature between 70 and 220° C.;

b) 0.1 to 30% by mass organogelling molecule of general formula (I) taken alone or in a mixture relative to the mass of bitumen is introduced; and c) the bituminous composition is heated at a temperature comprised between 70 and 220° C. under stirring, until a homogeneous bituminous composition is obtained.

20. The bituminous composition according to claim 1 wherein the hydrogen bond donor and the hydrogen bond acceptor, comprised in the Y group in the general formula (I) of the organogelling molecule, is an NH group and a C=O group respectively.

21. The bituminous composition according to claim 4 wherein the unsaturated fatty acids are chosen from oleic acid, linoleic acid, linolenic acid taken alone or in a mixture.

22. The bituminous composition according to claim 13 wherein the bitumen is chosen from bitumens of atmospheric distillation residues, vacuum distillation residues, visbroken residues, blown residues, mixtures and combinations thereof or synthetic bitumens.

* * * * *

UNITED STATES PATENT AND TRADEMARK OFFICE
CERTIFICATE OF CORRECTION

PATENT NO.         : 8,506,699 B2                     Page 1 of 1
APPLICATION NO.    : 12/744855
DATED              : August 13, 2013
INVENTOR(S)        : Chaverot et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 617 days.

Signed and Sealed this
Fifteenth Day of September, 2015

Michelle K. Lee
*Director of the United States Patent and Trademark Office*